T. A. BOOR.
HOSE CLAMP.
APPLICATION FILED OCT. 19, 1916.

1,238,629.

Patented Aug. 28, 1917.

WITNESSES
L. H. Schmidt
W. E. Beck

INVENTOR
THEODORE A. BOOR,
BY
ATTORNEYS

UNITED STATES PATENT OFFICE.

THEODORE A. BOOR, OF ASHVILLE, OHIO.

HOSE-CLAMP.

1,238,629.  Specification of Letters Patent.  Patented Aug. 28, 1917.

Original application filed December 15, 1914, Serial No. 877,336. Divided and this application filed October 19, 1916. Serial No. 126,498.

*To all whom it may concern:*

Be it known that I, THEODORE A. BOOR, a citizen of the United States, and a resident of Ashville, in the county of Pickaway and State of Ohio, have invented a certain new and useful Improvement in Hose-Clamps, of which the following is a specification.

One of the principal objects of my present invention is to provide an improved clamp more especially designed for securing a hose section about the adjacent ends of the pipe segments connecting an automobile engine with its radiator.

Another object of the invention is to provide an improved hose clamp in the nature of a spring-band clamping around the rubber hose on the outside of the same and resiliently retaining this hose against the pipe segments in such manner as to expand and contract with the metallic pipes, as the latter expand and contract, whereby to at all times securely retain the hose against the pipes so that a water tight joint is continuously maintained, and without the disadvantage of mashing the hose out flat against the metallic pipes, as is often the case with the use of hose clamps, in which provision for the expansion or contraction of the clamp with the metallic pipes has not been made.

With these and other objects in view, which will become apparent as the description proceeds, the invention resides in the construction, combinations, and arrangement of parts hereinafter more fully described and claimed, and illustrated in the accompanying drawings, in which like characters represent like parts throughout the several figures, in which:—

Figure 1:
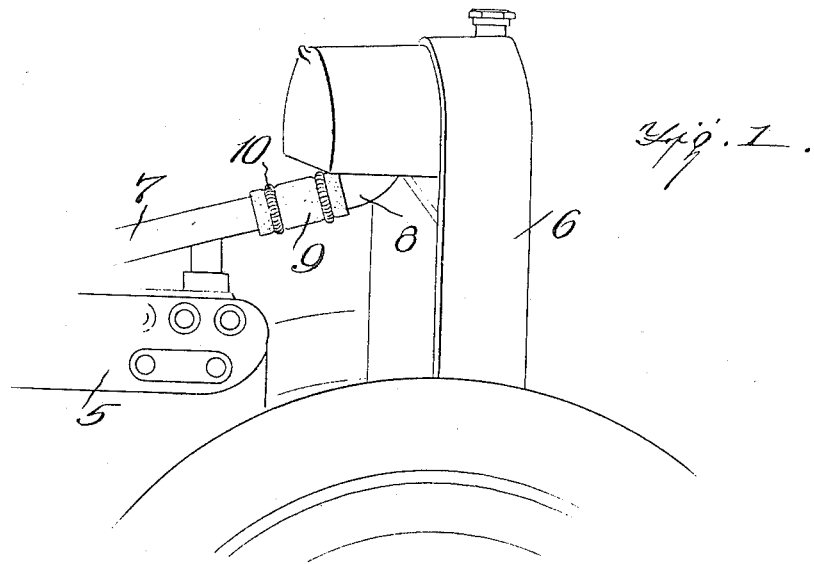
Figure 1 represents a view in perspective of a portion of an automobile engine and its radiator, the clamp being shown in position securing the hose connection between the pipe segments.
Figure 2:
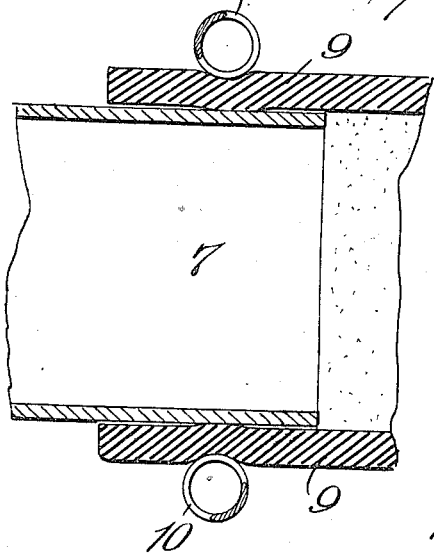
Fig. 2 represents a view in section taken longitudinally through a portion of the hose connection constructed in accordance with my invention.

Referring more particularly to the drawing, an automobile engine is indicated generally at 5, and its radiator at 6. The pipe leading from the water-jacket of the engine is indicated at 7, and the pipe section connecting with the radiator is indicated at 8. These pipe sections are connected together by means of the rubber hose section 9, and this section is clamped upon the pipe section by means of clamps, indicated at 10 forming the subject of my invention.

Figure 3:
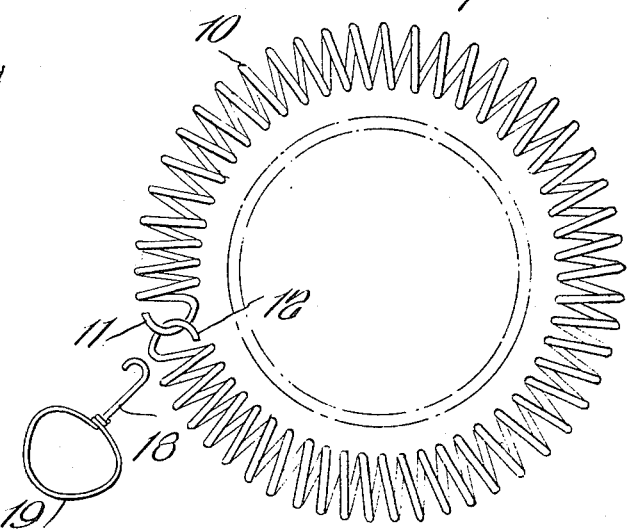
Fig. 3 represents an elevational view of the hose clamp and the implement used in manipulating the same.

The clamp consists of a helical spring of uniform diameter and made of a single length of suitable spring wire or other desirable material, having an integral hook 11 formed at one end, and a hook 12 formed at the other end, the planes occupied by the hooks being approximately at right angles to each other. When the clamps 10 are in place upon the hose section 9, they encircle the latter and resiliently retain it at all times in intimate contact with the external surfaces of the pipe sections 7 and 8. It is well known that the fluctuations in temperature of the water passing through the metallic pipe sections 7 and 8 affect the latter so that they expand as the water increases in temperature and contract as the water cools off. Thus when the metal pipes 7 and 8 are hot, they are approximately one-thirty-second ($\frac{1}{32}$) of an inch larger than when they are cold. In the old style clamps, employing the use of a solid band and a bolt or other device for tightening the band, the band being connected around the outside of the rubber hose sections, the heat of the water affects the pipe sections and results in their expansion, but does not become transmitted to the metallic clamps themselves, and therefore as the pipes expand, the rubber becomes mashed out at the sides of the clamps, and then when the pipes cool and contract, remains spread or mashed out because of the fact that it becomes slightly vulcanized by the heat of the pipes, and hence the pipes contract away from the rubber and the water-sealing joint between the rubber hose and the pipe sections becomes broken and a leakage through the joints thus occurs. Applicant's clamp, on the other hand, expands with the rubber, as the latter is increased in diameter by the expanding pipes and does not mash or spread the rubber out because of the fact that when the clamp is in place upon the rubber section, the convolutions of the clamps are slightly separated, as indicated in Fig. 3. When the pipes again contract on becoming cool, the spring-band contracts with them, closely shrinking after the rubber and retaining it at all times in a tightly bound position around the metallic pipes. Thus the pipes do not contract away from the rubber and hence the joint between the rubber and the metal never becomes broken but is always retained tightly closed during the various degrees of expansion and contraction of the pipes, and hence the joint does not leak.

Figure 4:
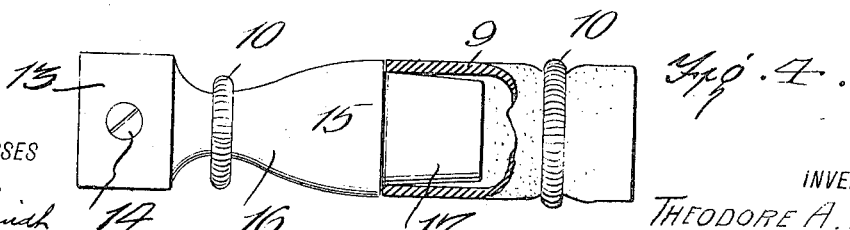
Fig. 4 represents a top plan view of a mandrel on which the clamp is assembled, indicating the method of placing the clamp upon the hose section.

A mandrel upon which the clamps are assembled and from which they are transferred to the rubber pipe section prior to placing the latter in position for connecting the metallic pipe sections is indicated in Fig. 4. This mandrel includes a base 13, which may be secured to any suitable support by means of a screw or other fastener 14, and a tapering body 15 having a reduced neck portion 16 adjacent the base, and a tapered reduced outer end portion 17, over which, as indicated in Fig. 4, the end of the rubber hose section 9 fits. When the rubber hose section is thus in place on the mandrel the outer surfaces substantially merge with the outer surfaces of the body 15 and the clamp 10 having been hooked together at its ends around the reduced neck portion 16, is rolled up over the body 15, thus becoming expanded and is rolled on to the rubber hose section 9. Two of the clamps are thus rolled up upon the section 9 and rolled along a distance removed from the ends thereof and then the rubber hose section is fitted at its ends upon the ends of the metallic pipes 7 and 8, whereupon the clamps are again rolled toward the ends of the rubber sections until they bind the same at desired points about the metallic pipes. It will thus be seen that when the clamps are placed upon the hose section they are under tension and hence they continuously tend to contract about the rubber section and always retain the same tightly clamped about the pipe sections. This ability of the clamps to be assembled upon the smaller portion of the mandrel without stretching the clamp, and then to be rolled up upon the rubber section over the larger portion of the mandrel, thus placing the band under tension renders the clamp exceedingly desirable and easy to properly assemble upon the hose section. An advantage also presents itself in that the clamp may be shifted to assume a desired position on the hose section by simply rolling the helical band along the hose section until it acquires the proper position thereon. In order that the ends of the spring band may be readily disconnected when it is desired to remove the clamp from the hose section, I provide a suitable hook, indicated at 18 having a handle portion 19. When the clamp is to be removed, the hook 18 is engaged with the hook portion 12 formed on the band and the hook is pulled out of the hook 11, thus disconnecting the ends of the spring.

It will be noted that my invention provides a self-adjusting elastic band, capable of being rolled over the ends of the hose to force a bulge on the inside thereof whereby to keep the surfaces of the metal tight, the said bands automatically operating to expand as the metallic pipes expand and to contract as they contract whereby to, at all times, maintain a tight joint between the rubber section and the pipes.

Although I have described the preferred embodiment of my invention, I may desire to make such changes in the construction, combination and arrangement of parts, as do not depart from the spirit of the invention and the scope of the appended claim.

The clamp disclosed in this application is shown and described, but not claimed, in my separate application Serial No. 877,336, filed December 15, 1914, allowed August 18, 1916, and issued April 24, 1917, Patent No. 1,224,062.

I claim:

The combination of a metal pipe, a resilient hose section encircling the metal pipe, and a resilient helical spring encircling the hose section and detachably connected together at its ends, the said helical spring being under tension and having its convolutions separated whereby to expand and contract with the metallic pipe and maintain uniform pressure upon the resilient hose.

THEODORE A. BOOR.